United States Patent [19]

Liu

[11] Patent Number: 5,565,669
[45] Date of Patent: Oct. 15, 1996

[54] ORIENTATION INDEPENDENT METHOD FOR ROBUST COMPUTING OF X-DIMENSIONS IN CODE ONE SYMBOLS

[75] Inventor: Lingnan Liu, Lynnwood, Wash.

[73] Assignee: Intermec Corporation, Everett, Wash.

[21] Appl. No.: 524,368

[22] Filed: Sep. 6, 1995

[51] Int. Cl.⁶ .................................................... G06K 7/10
[52] U.S. Cl. ........................................ 235/462; 235/463
[58] Field of Search ................................... 235/462, 463

[56] References Cited

U.S. PATENT DOCUMENTS 5,319,181  6/1994  Shellhammer et al. ................. 235/462
5,486,946  11/1995  Oliver ..................................... 235/462

OTHER PUBLICATIONS

Palmer, Roger C., *The Bar Code Book*, 2d ed., Helmers Publishing, Inc., Peterborough, NH, 1991, pp. 19–20, 61–62, 90–95, 137–148. No month.

*Uniform Symbology Specification Code One*, AIM USA, Pittsburgh, PA, 1994, Sep. 12, 1994, pp. 1–32.

Primary Examiner—Harold Pitts
Attorney, Agent, or Firm—Seed and Berry LLP

[57] ABSTRACT

A method and apparatus for estimating an X-dimension of a machine-readable symbol having a recognition pattern that includes elements comprising bars and spaces. The method and apparatus proceed from a boundary between two of the elements of the machine-readable symbol. The method and apparatus selects a plurality of sampling paths across a particular one of the elements at the boundary, and determines a median path length across the particular one of the elements out of each of the plurality of sampling paths. The selection of a plurality of sampling paths and the determination of the median path length are repeated for each of the elements of the recognition pattern. The method and apparatus then averages the median path length for all the elements to provide the estimated X-dimension of the machine-readable symbol.

15 Claims, 10 Drawing Sheets

ORIENTATION INDEPENDENT METHOD FOR ROBUST COMPUTING OF X-DIMENSIONS IN CODE ONE SYMBOLS

TECHNICAL FIELD

The present invention relates to a method of finding an X-dimension of a bar-code symbol.

BACKGROUND OF THE INVENTION

Bar code symbologies are widely used for data collection. The first bar code symbologies developed, such as UPC, EAN, Code 39, and Code 93 can be referred to as "linear" symbologies because data in a given symbol was decoded along one direction or axis. The next generation of bar-code symbologies called stacked symbologies, such as Code 49 and PDF 417, increased the information density of the symbol by employing several adjacent rows, each row having several characters defined by groups of multiple width bars and spaces. A recently developed symbology, Code One, is a two-dimensional matrix symbology. As shown by a symbol 200 of FIG. 1, Code One symbols include a center recognition pattern 202 surrounded by a matrix of square data cells 209. The Code One symbology includes several versions, each version having a predetermined size and a unique type of center recognition pattern 202.

The recognition pattern 202, which is comprised of a plurality of elements such as bars 204 and spaces 207, is scanned by a two-dimensional imaging device and found by a fast linear image search used for high speed scanning applications. The recognition pattern is used to identify the version (i.e., the type) of Code One symbol being used; however, the recognition pattern is also used to determine an X-dimension of the Code One symbol. The X-dimension is the nominal (or intended) width dimension of the bars 204, spaces 207 or data cells 209 in a symbology, as shown in FIG. 1. For Code One in particular, the X-dimension represents the smallest height (or width) of the data cells 209 in a given symbol. Thus, the X-dimension is used to determine the intended dimension that the area symbology is based on, regardless of priming errors, and is necessary for decoding the symbology.

In the prior art, when examining an unknown symbol, it was common to measure and compute the average size of the data cell 209 by using two sets of parallel scan lines, where the parallel scan lines of one set were approximately perpendicular to the parallel scan lines in the other set. At least one of the sets of scan lines would intersect the recognition pattern in such a way as to identify each horizontal bar and space in the recognition pattern 202. The estimated X-dimension, also known as the Z dimension (Z), was conventionally determined by dividing the pitch p, which is the measurement from a top of a lowest recognition pattern bar 203 to a top of an uppermost recognition pattern bar 205, by a number of elements within the pitch measurement. For example, if the pitch P of the recognition pattern 202 is 9 mm and there are nine elements, i.e., five bars and four spaces, then the Z dimension is 9 mm÷9=1 mm. The next step consisted of confirming that for all edge-to-edge measurements t, which includes a bar and a space, the equation $1.5 \leq t/Z < 2.5$ was true. The average bar width was calculated by dividing the sum of the bar widths by the number of bars, then verifying that: $0.5Z \leq$ Avg. bar width $<1.5Z$; if not, then the pattern was found to be in error and a new scan of the recognition pattern 202 was made. Thus, for the last example, the average bar width must fall between 0.5 mm and 1.5 mm, otherwise a new scan would be made.

Although the prior art method of determining the X-dimension worked when the Code One symbol was in its proper position relative to a scanning device (i.e., aligned), the method did not provide for misalignments due to curvature 206 of the pattern 202, as shown in FIG. 2A, or unknown orientation of the pattern 202, as shown in FIG. 2B. Further, the prior art method was prone to errors due to interruptions 208 and 210 in the pattern 202, as shown in FIG. 2C.

SUMMARY OF THE INVENTION

In accordance with one aspect of the present invention, a method estimates an X-dimension of a machine-readable symbol having a recognition pattern that includes elements comprising bars and spaces. The method proceeds from a boundary between two of the elements of the machine-readable symbol. The method comprises the steps of selecting a plurality of sampling paths across a particular one of the elements at the boundary, and determining a median path length across the particular one of the elements out of each of the plurality of sampling paths. The method also comprises the steps of repeating the selection of a plurality of sampling paths and the determination of the median path length for each of the elements of the recognition pattern, and estimating the X-dimension of the machine-readable symbol based on the minimum path length for at least some of the elements.

In accordance with another aspect of the present invention, an apparatus estimates an X-dimension of a machine-readable symbol having a recognition pattern that includes elements comprising bars and spaces. The apparatus proceeds from an initial boundary between two of the elements and the machine-readable symbol. The apparatus comprises a sensor that receives light reflected by the machine-readable symbol and produces an output signal therefrom, and a receiver that receives the output signal from the sensor and produces a dial signal indicative of the recognition pattern. The apparatus further includes a processor for processing the data signal and determining the X-dimension of the symbol. The processor is programmed to select a plurality of sampling paths across a particular element at the initial boundary, determining median path lengths across the particular element of each of the plurality of sampling paths, and then continues to repeat these two steps for each of the elements of the recognition pattern and then averages the median path length for all of the elements to provide the estimated X-dimension of the machine-readable symbol.

In accordance with yet another, aspect of the present invention, a method of sampling is used to estimate the X-dimension of a Code One symbol having a recognition pattern containing elements consisting of bars and spaces each having a width and a length, an initial boundary between two of the elements having been determined. The method comprises the steps of selecting an amount of samples to be taken of the width of a particular one of the elements, separating the samples at equidistant positions along the boundary between two of the elements, determining an initial edge direction for each of the samples that is perpendicular to a line that is tangent to the boundary of a position of a respective one of the samples, and measuring over a preselected number of intervals along the edge direction and intensity of the particular one of the elements for each of the samples, where each use of the preselected number of intervals covers an area of less than the width of the particular one of the elements. The method also comprises the steps of averaging the intensity of the preselected number of intervals to calculate the average intensity of the element and repeating this for each of the samples, calculating a threshold intensity of the element for each of the samples, where the threshold intensity for one of the bars is a first predetermined percentage above the average intensity, and the threshold intensity for one of the spaces is a second predetermined percentage below the average intensity, proceeding by at least one of the intervals to measure intensity along the edge direction for each of the samples until at least one of the measured intensity exceeds its threshold intensity when the element is one of the bars, and the measured intensity falls below the threshold intensity if the element is one of the spaces. The method further comprises the steps of determining a terminating boundary and a width of the element for each sample based on the intervals proceeded, ascertaining a terminating edge direction at the terminating boundary and comparing it with its corresponding initial edge direction for each sample to determine if the path of the sample is traveling perpendicular to the length of a particular one of the elements, and if it is not redetermining the initial edge direction and repeating the steps-of determining the initial edge, measuring over a preselected number of intervals, averaging the intensity of the preselected number of intervals, calculating a threshold intensity of the element, proceeding at least one of the intervals, determining a terminating boundary, and ascertaining a terminating edge. The method also comprises the steps of selecting a median width from the determined width of each sample of the particular one of the elements, and repeating all of the prior steps for each element of the recognition pattern by making the terminating boundary the initial boundary. Finally, the method further comprises the steps of comparing the median value of the median width of each element of the recognition pattern and discarding any of the elements that deviate by more than a third predetermined percentage from adjacent elements leaving only trimmed minimum width values, and summing the trimmed median width values and dividing by the number of elements remaining after the step of comparing the median value of the width of each element to calculate the estimated X-dimension.

DETAILED DESCRIPTION OF THE INVENTION

Figure 1:
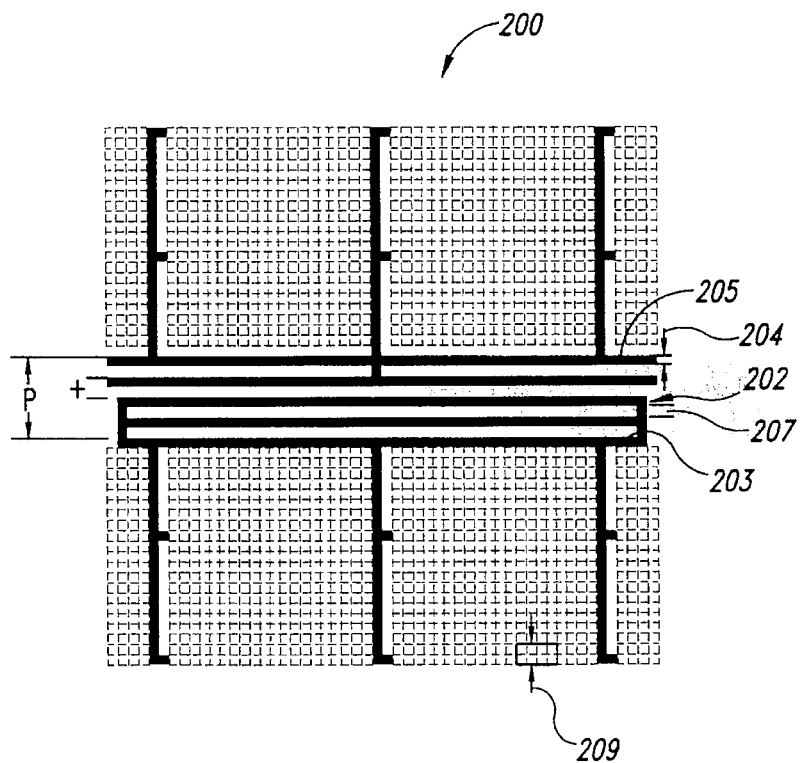
FIG. 1 shows a Version E Code One symbol.
Figure 2A:
FIG. 2A shows an example of symbology curvature in a portion of a recognition pattern of a Code One symbol.
Figure 2B:
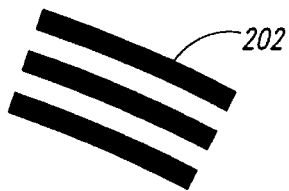
FIG. 2B shows an example of a symbol misaligned with a scanning device.
Figure 2C:
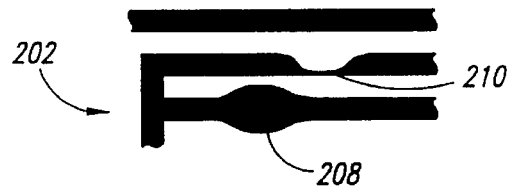
FIG. 2C shows an example of interruptions in a portion of a recognition pattern of a Code One symbol.
Figure 3:
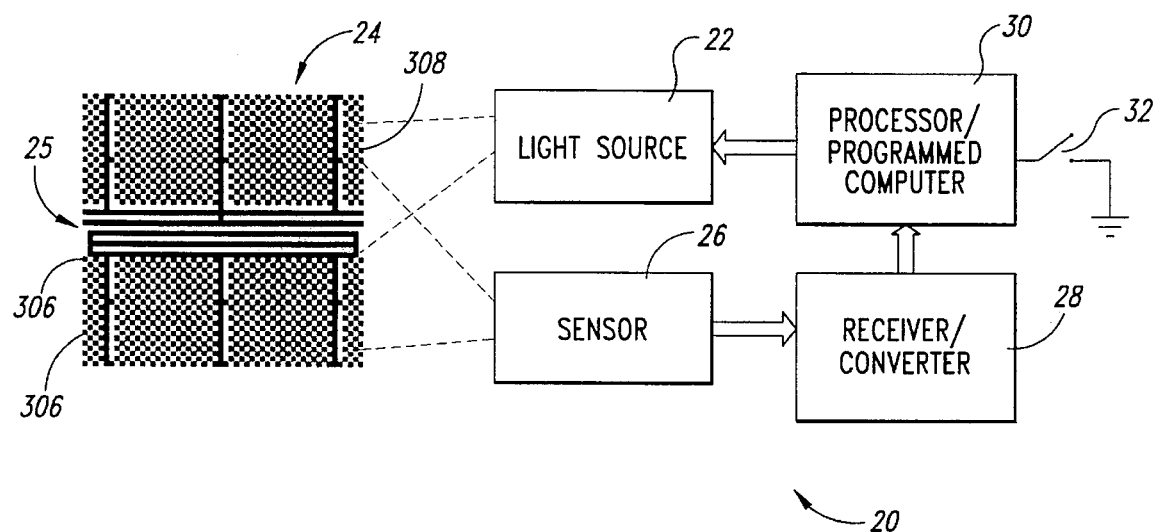
FIG. 3 shows a block diagram of a symbology reader of the present invention.

As shown in FIG. 3, a data collection symbology reader 20 of the present invention includes a light source 22 that illuminates a data collection symbol, such as the Code One symbol 24 having a recognition pattern 25. As used herein, a data collection symbol refers to a symbol from any linear, stacked, area or other machine readable symbology. A sensor 26 in the reader 20 receives the light reflected from the symbol 24 and converts the received light into an electrical signal. The light source is preferably a flash bulb, infrared light source, one or more LEDs or other light emitting elements, while the sensor 26 is preferably a charge coupled device ("CCD"), two-dimensional semiconductor array, vidicon, or other area imager capable of converting received light into electrical signals.

A receiver or converter 28 receives the electrical signal from the sensor 26 and converts it into a signal to be processed by a programmed computer or processor 30. Typically, the sensor 26 produces an analog signal that represents the modulated light reflected from the elements in the symbol 24. If the processor 30 is a digital computer, then the converter 28 converts the analog signal into a digital signal to be processed by the processor 30. The converter 28 and/or processor 30 preferably include a memory for storing the digital signal. As described more fully below, the processor 30 of the reader 20 performs a routine stored in memory that provides an accurate estimate of the X-dimension of symbol 24 regardless of whether the symbol has curvature, has an orientation that is not known, or whether the symbol is distorted. The routine accomplishes this by using a distributed computation so that one error from a particular area of the symbol 24 does not have a dramatic impact on the final calculation of the X-dimension.

The sensor 26 preferably includes a rectangular array of photosensitive elements, such as CCDs. Each pixel element in the rectangular array outputs a gray level signal ranging from 1–15, i.e., an analog signal that determines the amount or intensity of light impinging upon a particular pixel element. Alternatively, each pixel element in the array of the sensor 26 can output a binary signal indicating that the particular pixel element is either black or white. After the signals from the sensor 26 are approximately converted by the converter 28, the processor 30 stores the signals produced by the sensor as an image within a field of view of the sensor 26. As a result, the processor 30 may repeatedly analyze and manipulate the stored signals.

The reader 20 can be a hand held product and can include a trigger switch 32 coupled to the processor 30. By actuating the trigger switch 32, the processor 20 causes the light source 22 to provide light to the symbol 24 that is reflected therefrom to the sensor 26. Since the processor 30 stores the signals that are output from the sensor 26 and converted by the converter 28, a user, by actuating the trigger switch 32, can cause the reader 20 to store an instantaneous image within the field of view of the reader 20, creating a snapshot of the symbol 24. The specific means and method for storing and locating an image of the symbol 24 are well known and will be understood by those skilled in the relevant art without further need for description herein.

Figure 4:
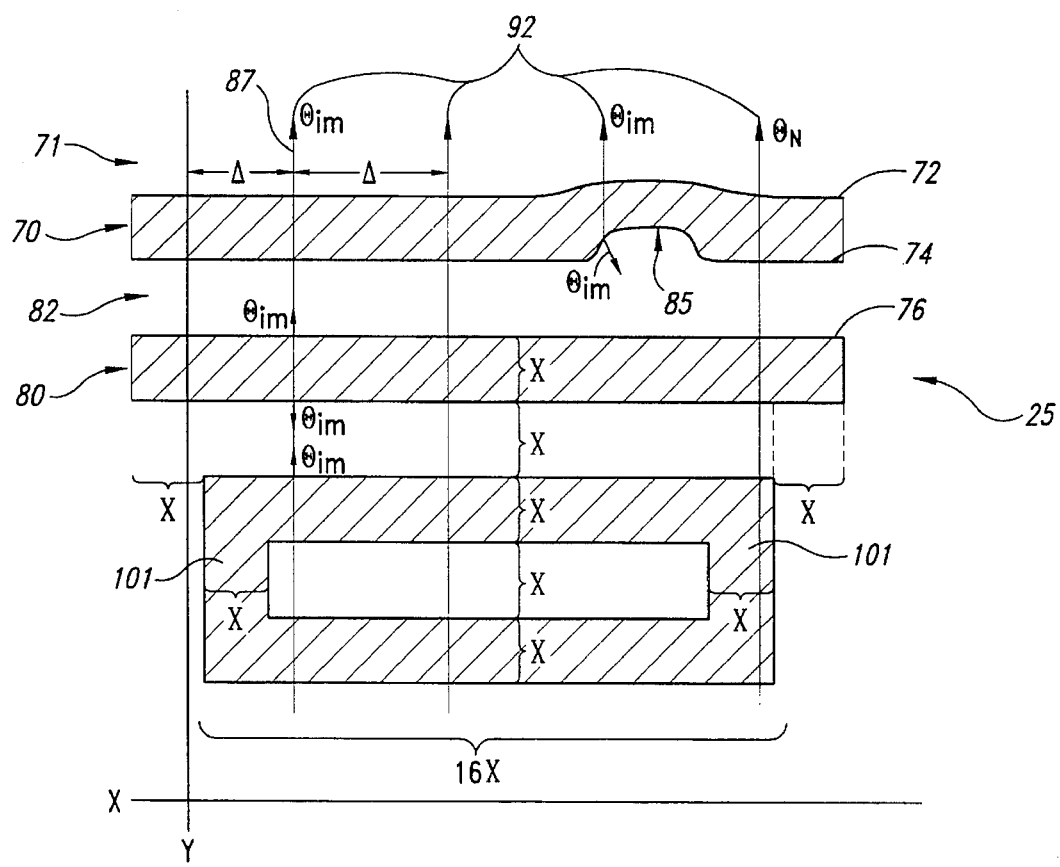
FIG. 4 is a portion of a recognition pattern from a Code One symbol that shows the use of computing paths along a bar of the recognition pattern.

The routine stored in the memory of processor 30 uses the instantaneous image stored in the reader 20 to determine the X-dimension of a machine readable symbology, like symbol 24 of FIG. 3, by locating its recognition pattern 25. Then, as shown in FIG. 4, a boundary between a bar and a space, such as line 72 in the recognition pattern 25, is found and along this boundary a plurality of samples are taken along a plurality of sampling paths 92 that cross the bar or space at the boundary in a direction perpendicular to a line tangent to the boundary. The sampling paths 92 are preferably separated at equidistant positions along the boundary. A direction perpendicular to the boundary and always facing away from a bar is known as the edge direction $\Theta im$. The length of each sampling path across the bar or space is determined by comparing an intensity reading taken every pixel length k along a path defined by the edge direction $\Theta im$ with a predetermined threshold value. When the threshold value has been reached, an average intensity of the bar or space is calculated based on the intensity readings taken over the series of intervals measured, then a new threshold value is calculated based on a percentage of the average intensity calculated. Once this new threshold has been passed, the length of the sample path is set equal to the number of intervals it took to cross the bar or space. These steps are performed for each sampling path m. Each sample path m along a bar in the recognition pattern 25 is then compared with the other paths through that particular bar to determine an average path length which is the minimum width of the bar. The process is similarly performed for the spaces in the recognition pattern 25. Thereafter, the edge direction $\Theta im$ of each path is compared to a threshold value, usually 45°, to avoid the possibility of the sample path m hitting a vertical wall 101 in the recognition pattern 25.

Once the average bar width and space width for each respective bar and space is found, the average value of the average width of all the bars and the average value of the average width of all the spaces are determined. The average width of each of the bars is then compared to the average value of the average width of all the bars, and any individual average bar width that deviates from the overall average by more than an acceptable percentage is discarded. This same discarding process is performed for the average widths of each space. Finally, the remaining average bar widths and space widths are averaged to yield an X-dimension free from errors due to distortion.

Figure 5A:
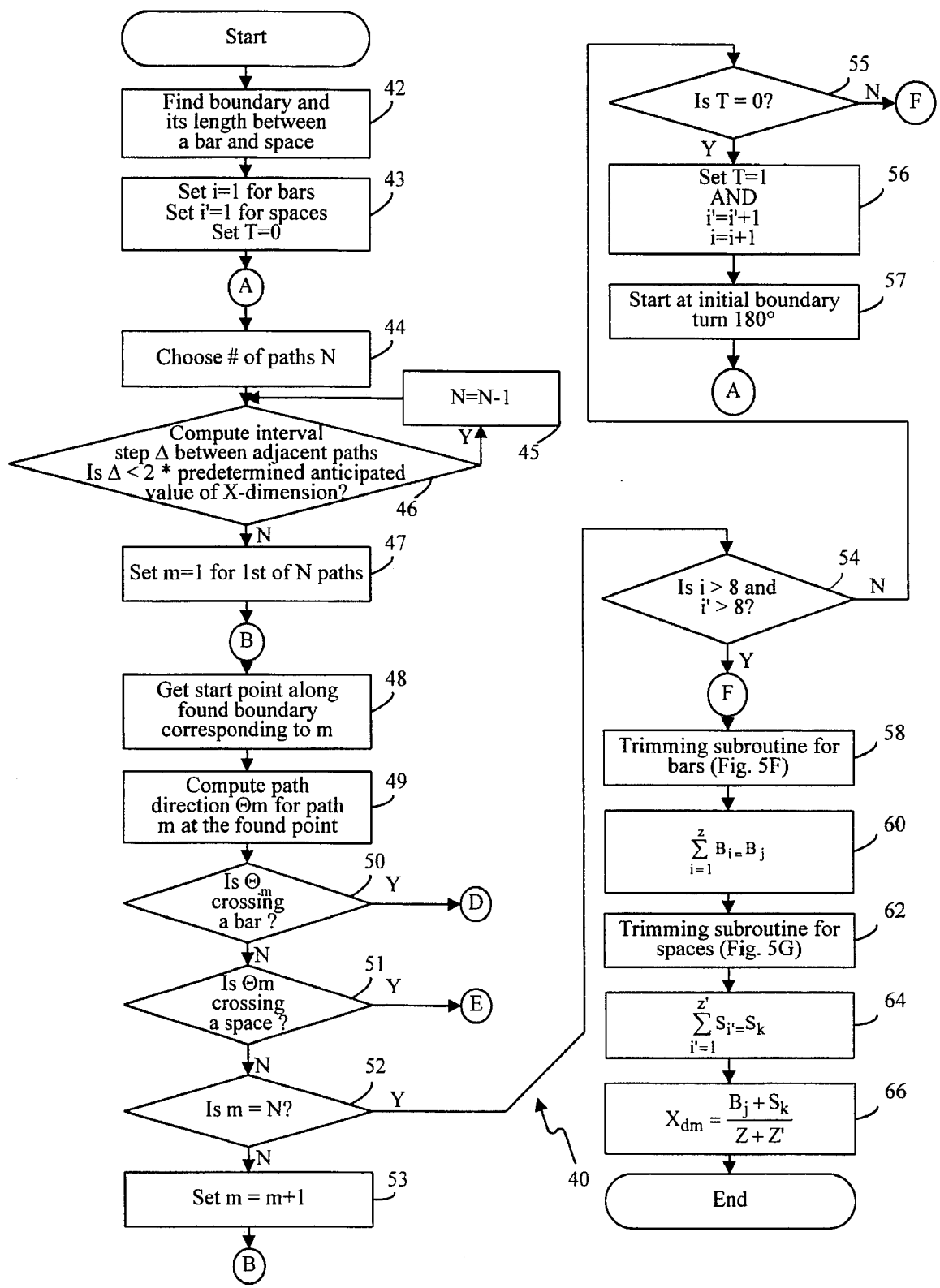
FIG. 5A is a flowchart which shows a main program implementing a method of estimating the X-dimension of a Code One symbol.

In a first embodiment, the processor 30 is controlled by software that is stored as a series of program instructions in the memory of the processor 30 to perform the above-described process for acquiring the X-dimension. Flow-charts from which source code can be written by one skilled in the art are illustrated in FIGS. 5A–5G. Referring to FIG. 5A, a main routine 40, which is executed by the processor 30, begins in step 42 by determining the line boundary and its length within the recognition pattern 25 of the symbol 24. The line boundary as previously stated is a transition between elements, such as the transition between a space 71 and a bar 70, i.e., the line 72 of the recognition pattern 25, as shown in FIG. 4. Other examples of line boundaries are lines 74 and 76.

The line boundary between elements, such as a space and a bar, is determined by methods well known in the art. For example, an edge detection algorithm could repeatably be used whereby edge points, as determined by the repeated application of the detection algorithm, are grouped together to define the boundary as line 72. As an alternative, a Hough transform, which detects straight line segments, can be used to determine one of the line boundaries, such as line 72 in the recognition pattern 25.

In step 43, the processor 30 initializes a value i, which when the routine 40 is completed will represent the total number of bars in the recognition pattern 25, and a value i', which when the routine 40 is completed will represent the total number of spaces in the recognition pattern 25, to a value of 1. Further, a state variable T, which indicates the direction that the sampling is traveling, is set to zero. Then, in step 44 the processor 30 determines an N number of sampling paths m, i.e., a number of samples 92 along the line 72 in FIG. 4. The N number of sampling paths m can be varied by the user with an external control (not shown) or preferably determined by the processor 30. The value of N is based on the processing speed required by the processor 30, where the N number of computing paths will be reduced when high symbol decode speed is required. On the other hand, if the recognition pattern 25 is replete with distortions and interruptions, then the value of N would be increased to enhance the accuracy of the reader 20.

In step 46, the processor 30 calculates an average interval step $\Delta$ between adjacent paths 92 by dividing the length of the line boundary, i.e., line 72, which is defined by the number of pixel lengths k along the line boundary, by the number of paths N. If the value of $\Delta$ is less than twice some predetermined anticipated value of the X-dimension, then the value of N is decremented in step 45 until $\Delta$ is at a value which ensures that the sampling intervals are not too closely spaced.

In step 47, the processor 30 initializes the value m, which indicates the path being operated upon out of the N paths running through the bar i or space i'. In step 48, the processor 30 locates a starting point along the line boundary corresponding to the path m. Then, in step 49 the processor 30 computes an edge direction $\Theta im$, for the path m in the recognition pattern 25, such as the path 87 from the bar 70 of FIG. 4. The edge direction $\Theta im$ is always perpendicular to the tangent of the line boundary, in this case perpendicular to the line boundary 72. Further, $\Theta im$ and $\Theta i'm$ point in a direction away from an entry point of a bar and the exit point of a bar for the path m, respectively (see bar 80). Thus, $\Theta i'm$ is indicative of the direction of travel through the pattern 25 along the path m.

In step 50 the processor 30 determines whether the direction of travel along the path m is about to enter a bar, and if so to branch off at node D into a routine 100, as shown in FIG. 4B, for measuring the width of a newly encountered bar along that direction of travel. Similarly, step 51 determines whether the direction of travel along the path m is about to enter a newly encountered space, and if so to branch off at node E into a routine 150, as shown in FIG. 4D, for measuring the width of the newly encountered space along that direction.

Once the measurement of a bar or space has been completed, as discussed below, for one direction, a new measurement for another element in the direction of travel for path m will be taken until the "i"th bar or the "i"th space have been measured. Then the processor 30 in step 52 determines if the path m is equal to the total number of sampling paths N, if it is not, then the program increments the value of the path m by one in step 53 and returns to point B in the routine 40. If the value of m is equal to N, then the routine 40 moves on to step 54. In step 54 the processor 30 checks to see if the number of bars and spaces processed exceeds 8. A Code One symbol has a maximum of eight bars and eight spaces in its recognition pattern 25, as described in AIM Uniform Symbology Specification for Code One, incorporated by reference herein. Thus, if the value of i or i', which represents the number of bars or spaces processed, respectively, exceeds eight, then all the bars and spaces have been processed. If not, the processor 30 proceeds to step 55 and determines whether the state variable T is set at zero. If T is not equal to zero, then the processor continues to proceed in routine 40 at node F. However, if T is equal to zero, the processor 30 proceeds to step 56 and sets T equal to one, then increments the value of i and i' by one. In step 57, the processor 30 starts at the initial boundary, once the sampling is begun in a direction 180° from the previous direction, then the processor 30 continues the routine 40 at node A. If there are no more bars or space widths to be measured, then the acquired widths are processed in steps 58–66 to estimate the X-dimension of the Code One symbol, as discussed below.

Figure 5B:
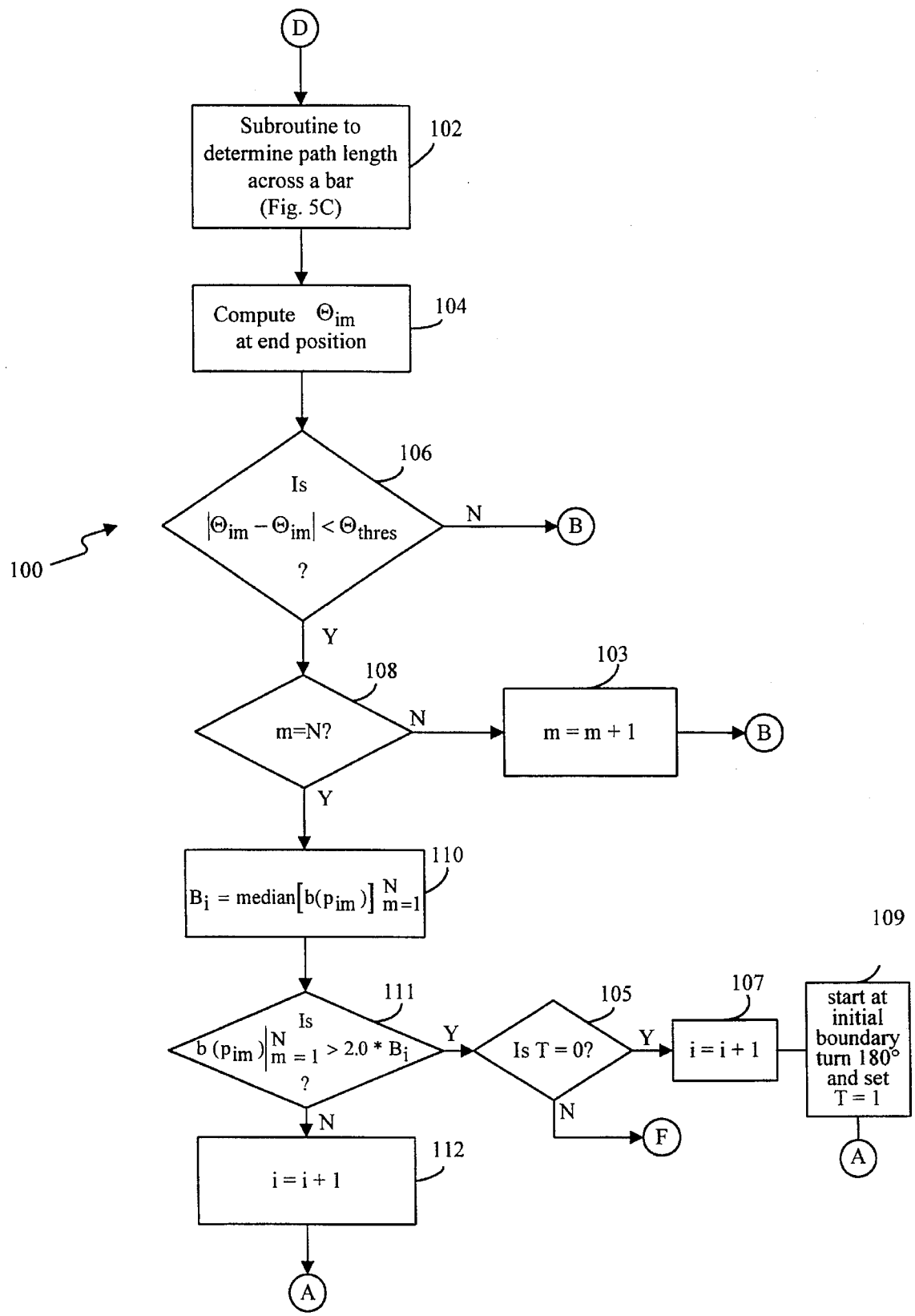
FIG. 5B is a flowchart of a routine invoked to determine the median width of a bar.
Figure 5C:
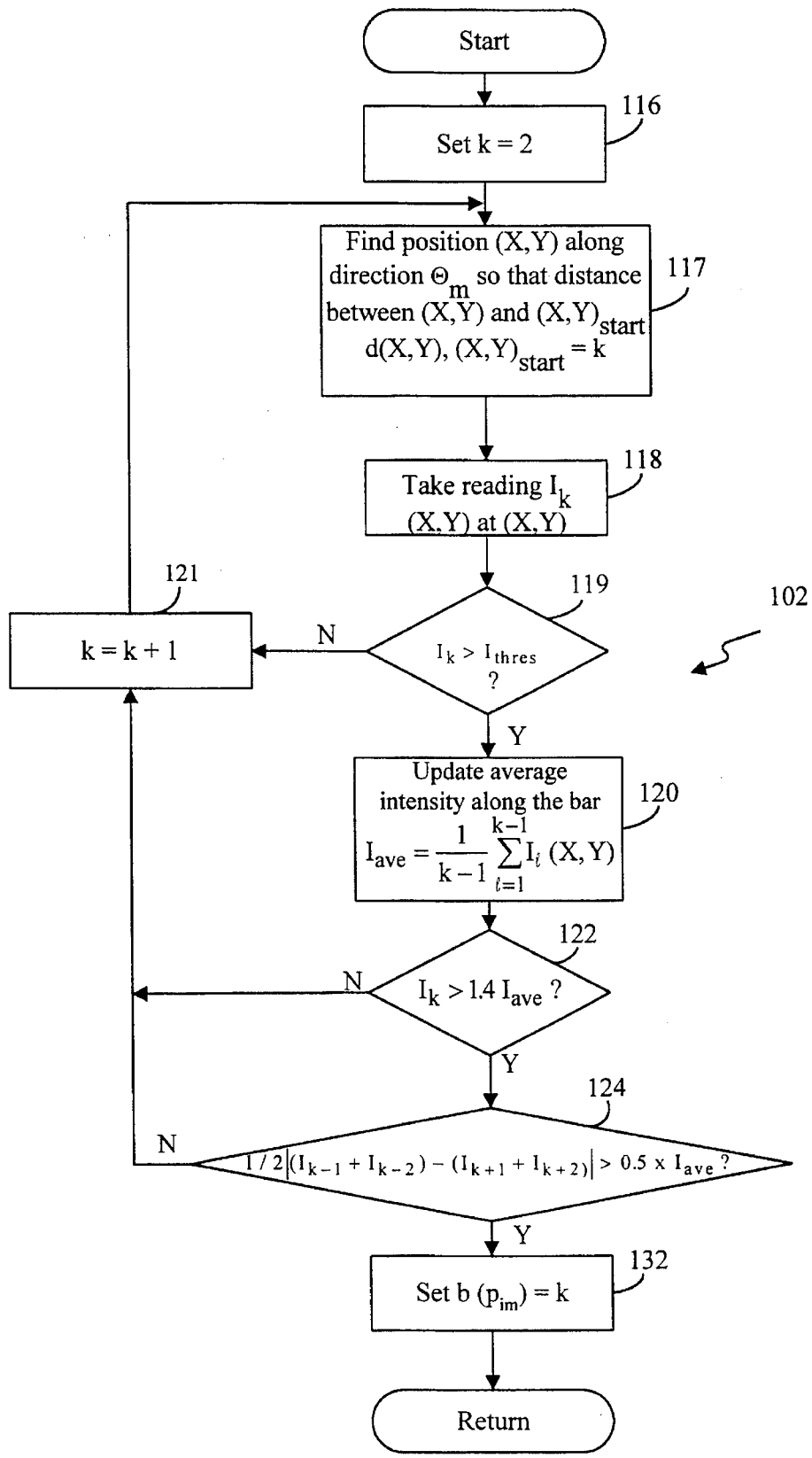
FIG. 5C is a flowchart of a subroutine invoked to determine the width of a bar at various points along its length.

If in step 50 the processor 30 determines that the direction of travel along path m is about to cross a bar, such as the bar 70 of FIG. 4, then the processor 30 will branch to the routine 100, as shown in FIG. 5B, which is used to determine the average width of the newly encountered bar. The first step in the routine 100 is the subroutine 102, shown in FIG. 5C, which when invoked determines a path length across the bar for each path m in a selected direction.

Initially, in step 116 the subroutine 102 sets k, i.e., a number of pixel lengths along the path m in a bar or space, to a value of k=2 to cover a portion of the image representing the measured bar beyond its potentially inconsistent edge. Thus, confusion as to the intensity at an edge due to lens aberration, poor focus, etc. is eliminated by beginning the measurement of intensity two pixel lengths beyond the edge of the bar. In step 117 a position (x, y) along the direction of travel determined by Θi'm is monitored. The amount of movement along the direction of travel is made such that the distance between the starting point coordinates ($x_{start}$, $y_{start}$) and the monitored position (x, y) is equal to a pixel length k=1. Next, in step 118, the processor 30 records an intensity measurement $I_k$ (x, y) at the monitored position (x, y) at the pixel length k. In step 119, the intensity $I_k$ (X, Y) at the monitored position is compared with a predetermined threshold intensity $I_{thres}$.

In a preferred embodiment, the threshold intensity $I_{thres}$ is precalculated by computing a histogram within a 100×100 pixel area in the center of the instantaneous image stored in reader 20. The processor 30 then determines the highest peak intensity of the image $I_{high}$ and the lowest peak intensity $I_{low}$ of the image and $I_{thres}$ is the average of those values, i.e., $I_{thres} = \frac{1}{2}(I_{high} + I_{low})$.

If the monitored intensity $I_k$ (X, y) is below or equal to the threshold $I_{thres}$, then the value of k is incremented by one in step 121 and the subroutine 102 beginning with step 117 is repeated. If $I_k$ (X, y) rises above $I_{thres}$, then, in step 120, the processor 30 calculates the average intensity value Iave along the bar, such as the bar 70 of FIG. 4, by summing the intensities $I_k$ (x, y) along the path m. The path m is defined by the direction Θim at each pixel k such that:

$$Iave = \frac{1}{k-1} \left( \sum_{l=1}^{k-1} I_l(X,Y) \right).$$

Figure 6:
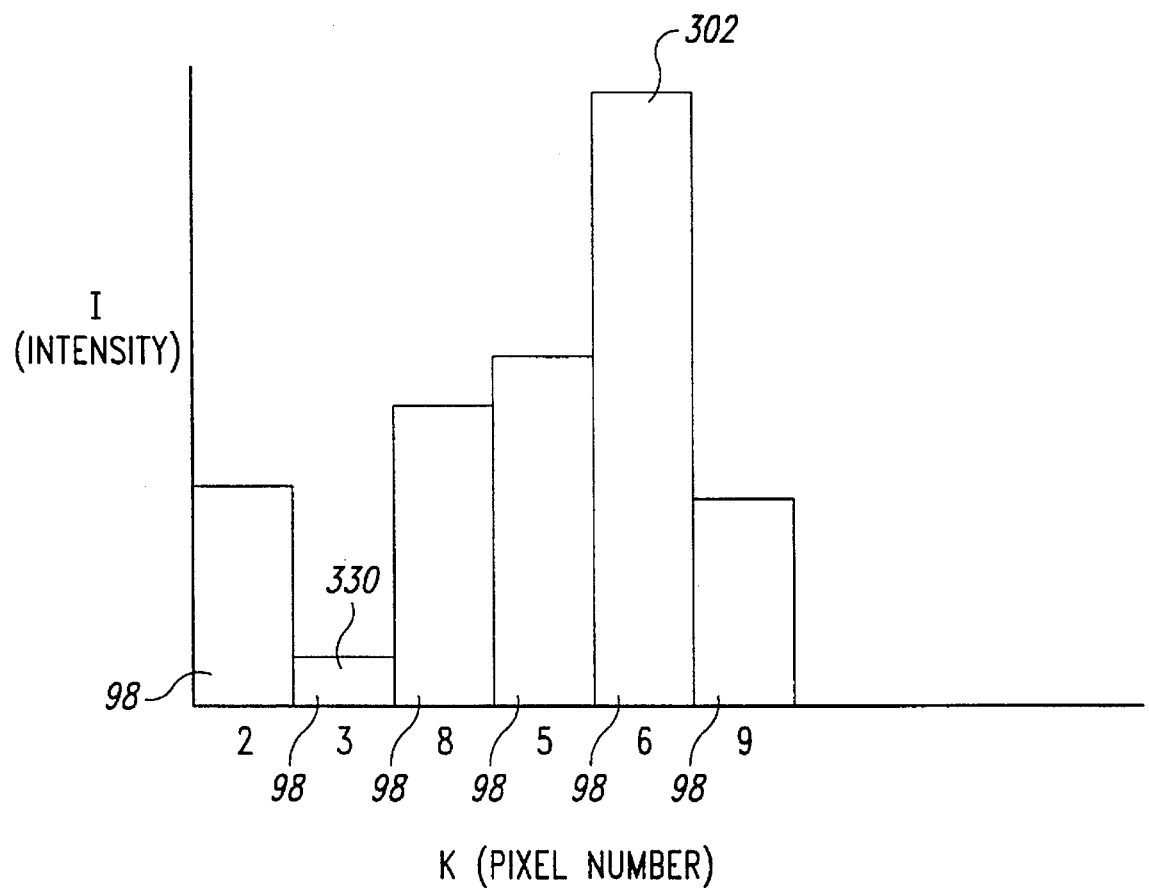
FIG. 6 is a histogram used to compute average intensity of a bar or space.

Usually, the average intensity Iave runs anywhere on a gray scale ranging from 1 (black) to 15 (totally white). In a preferred embodiment, Iave for the path m being measured is calculated using a histogram, as shown in FIG. 6, where the median value is defined by averaging areas 98 of the histogram. Further, the areas 98 of the histogram that represent erroneous values can be eliminated in the preferred embodiment by trimming extreme values. For example, the histogram of FIG. 6 shows intensity readings at six different pixel lengths k=2 through k=7 shown along the sampling path 87 for the bar 80 in FIG. 4. If the six pixels worth of readings (i.e., k=2 to k=7) were taken for an intensity measurement of the bar, the greatest intensity pixel value 302, in this example k=6 and the lowest intensity pixel value 300, in this case k=3, can be filtered out and disregarded.

Once the average intensity Iave has been calculated, the processor 30 in step 122 compares the intensity of the presently monitored point $I_k$ (x, y) to 140% of the average intensity Iave, in other words 1.4*Iave. If the intensity of the monitored point does not exceed 1.4*Iave, then the value of k is incremented by one interval and steps 117 and 118 are repeated to take a new intensity reading. Thus, minor variations in the gray scale read from a bar will not be misinterpreted as the actual ending of the bar. If the intensity $I_k$ (x, y) exceeds 1.4*Iave, then the processor proceeds to step 124 and determines whether the bar has been completely crossed. The processor 30 determines the intensity of the two previously monitored points $I_{k-1}$ and $I_{k-2}$ and adds these values, then it determines the intensity of the two following points to be monitored along the path of travel $I_{k+1}$ and $I_{k+2}$ and adds these values. The absolute value of the differences of these two sums is compared with the average intensity as follows:

$$\tfrac{1}{2}|(I_{k-1}+I_{k-2})-(I_{k+1}+I_{k+2})|>0.5I_{ave}.$$

The processor 30 considers the crossing of the bar as having been completed when the difference in intensities between the previously monitored points and the points to be monitored along direction of travel, i.e., path 87 in FIG. 4, exceeds the average intensity value $I_{ave}$. By sampling the intensities before and after the position believed to be where the bar terminates and identifying that the intensity difference exceeds Iave, the accuracy of determining the end of the bar is greatly increased, and the chance of error due to a "light spot" in the bar is eliminated. The position of the bar crossing (x, y) and the value of k at which the crossing was completed is recorded as a value $b(p_{im})$ =k in step 132. The subroutine 102 then returns to branch 100 and proceeds to step 104. If the threshold is not exceeded in step 124, then the value of k is incremented in step 121 and the process repeatedly proceeds from step 117 until the average intensity is exceeded.

In step 104 of the routine 100 (FIG. 5B), the processor 30, once it has determined the bar width under subroutine 102, calculates the terminating edge direction Θi'm for the ending position of a path, such as path 87 in FIG. 4. Then, in step 106 the processor 30 uses the direction Θim to determine if the path along which the intensity measurement was taken is satisfactory. For example, if a path 96 deviates due to a distortion 85 as shown in FIG. 4, then the resulting continuation along that path in the edge direction Θi'm 99 will lead to erroneous results. The path, such as 96, is tested for errors by requiring that Θim, which is the entry edge direction for bar i sampled in path m, and Θi'm, which is the exit edge direction for the same bar i and path m, not deviate by some predetermined threshold angle $Θ_{thres}$. In a preferred embodiment $Θ_{thres}$ is 45°. If the processor 30 in step 106 determines that the path m does not meet these conditions, then the edge direction Θim is recomputed and the process for determining the bar width for that path is repeated by branching to node B of the main routine 40. Thus, the angled path 96 continues along a corrected path, even if it had originally been deflected toward a sidewall 101 due to some distortion in the bar 70.

Once the processor 30 in step 106 determines that the path m is satisfactory, then the value of m is incremented by one in step 103, the subroutine 100 loops back to node B in the routine 40 and the width of bars along the next path m is determined and recorded until widths for paths 1 to N of bar i have all been measured and step 108 allows the processor 30 to proceed. In step 110, the processor 30 compares the stored lengths of each of the paths M, i.e., 1 to N on a particular bar i, and determines the median bar width $B_i$ for the bar by the following equation:

$$B_i = \text{median}\{b(p_{im})\} \, _{m=1}^{N}.$$

This reduces inaccuracies caused by the angled path 96, as shown in FIG. 4 and assists in determining the average bar width throughout the bar's length. The average bar width Bi is obtained since absent any significant distortions would be filtered out as discussed below, and the average path length through a bar would most likely be a path perpendicular to the initial boundary and exit point and therefore represents the true width of the bar. In a preferred embodiment, the path $B_i$ of the resulting average bar width will meet the condition $B_i > B_{thre}$, a predetermined bar threshold. This threshold can be determined based on empirical data, or preferably, it can be determined based on an average of the values $b(p_{im})=k$ over every path m. Thus, the processor 30 is prevented from using an erroneous maximum or minimum value for the bar width in the final calculation, as described below.

Next, in step 111, the processor 30 compares each path length value of $b(p_{im})$ across the bar to a value twice the median value $B_i$, i.e., $2*B_i$, to determine if these positions being monitored along the direction of travel has left the recognition pattern 25 and entered the data portion 306 or vertical wall 101 of the symbology 24 as shown in FIGS. 3 and 4 respectively. If it has, then the routine proceeds to step 105 and the processor 30 tests the state variable T which, as noted above, indicates the direction that the sampling is traveling. If T=0, then the value of i is incremented by one in step 107 to allow a new element to be evaluated and the direction of travel is reversed by 180° and restarted from the initial boundary in step 109. Further, in step 109, the state variable is changed to 1 to indicate that the path has been reversed and then the routine returns to node A of the main routine 40. When T is determined to be 1 in step 105, the processor 30 in step 155 exits to node A of the main routine 40. If, in step 111 the processor 30 determines that $b(p_{im})$ is not more than twice as wide as Bi, then the program proceeds to step 112 which increments the value "i", and a new element, either a bar or space, will be evaluated starting at step 44 of the main routine 40.

Once the width of the bar 70 has been determined, the measurements along path m continue. The processor 30 in step 51 of the main routine 40, shown in FIG. 5A, branches off at node E to routine 150, shown in FIG. 5D, when it determines that the direction of travel along path m is about to cross a space, such as the space 82 of FIG. 4.

Figure 5D:
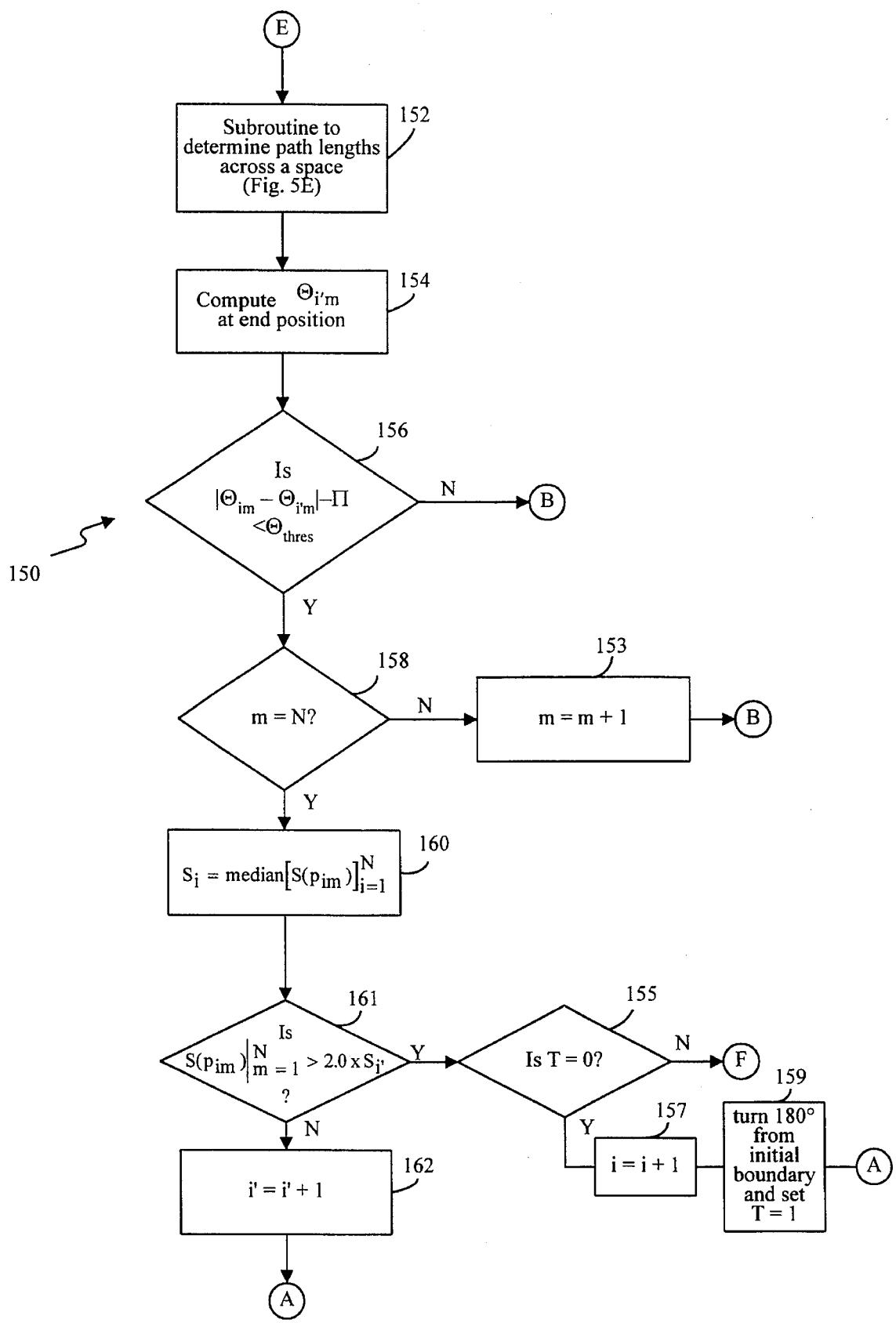
FIG. 5D is a flowchart of a routine invoked to determine the median width of a space.
Figure 5E:
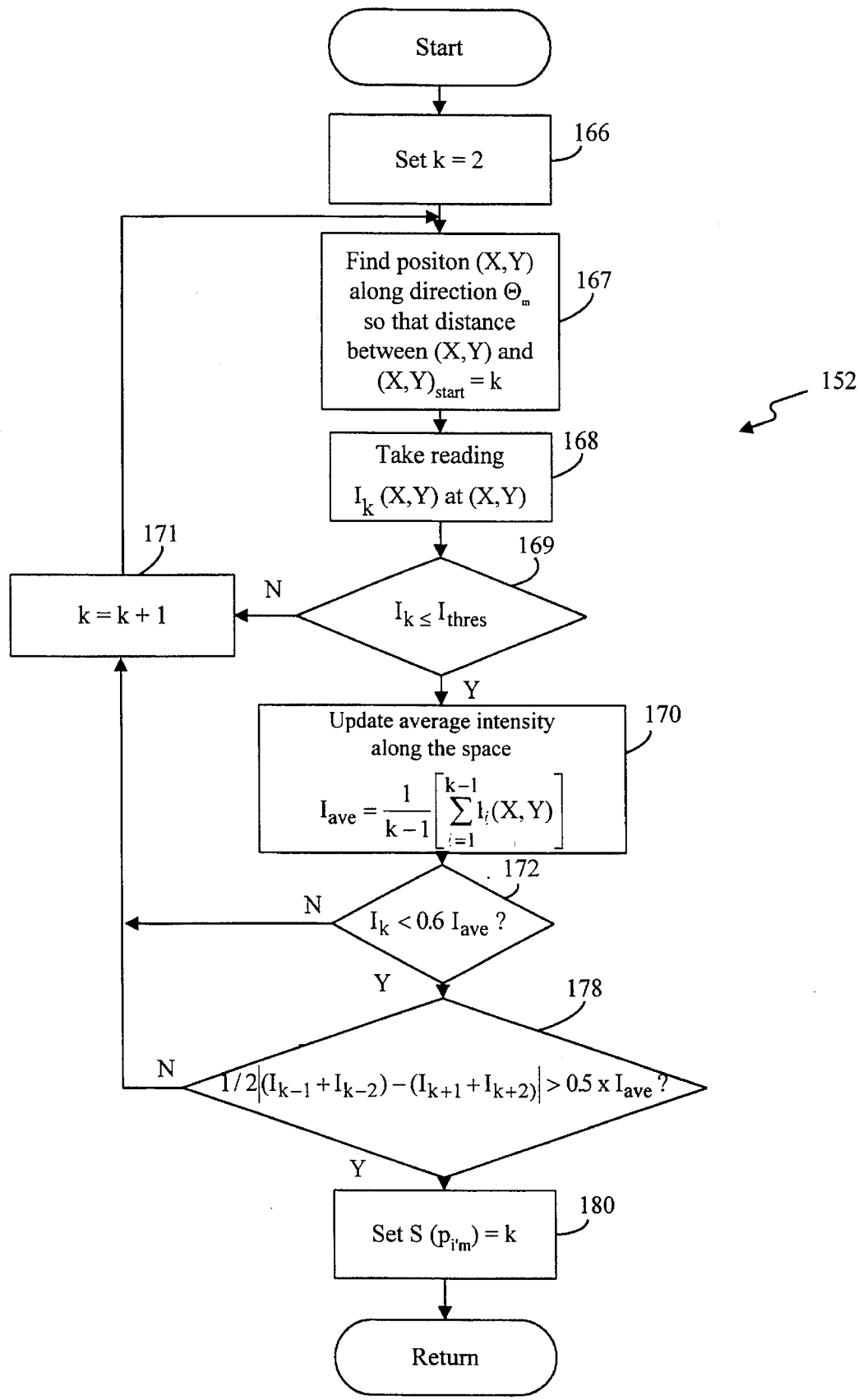
FIG. 5E is a flowchart of a subroutine invoked to determine the width of a space at various points along its length.

Initially subroutine 152, shown in FIG. 5E, is used by processor 30 to determine the width of the newly encountered space for each path m in a selected direction. The subroutine 152 in step 166 sets k as did the subroutine 102 to prevent confusion as to intensity level that may result at an edge of a space between bars due to lens aberrations, poor focus, etc. In step 167 a position (x, y) along the direction of travel determined by Θim is monitored by the processor 30. The amount of movement along the direction of travel is made such that the distance between the starting point coordinates ($x_{start}$, $y_{start}$) and the monitored position (x, y) is equal to the one pixel length k (k=1). Next, in step 168, the processor 30 takes an intensity measurement $I_k$ (x, y) at the monitored position (x, y) for the pixel length k. In step 169 the intensity $I_k$ (x, y) at the monitored position is compared with a predetermined threshold intensity $I_{thres}$. In a preferred embodiment $I_{thres}$ is calculated using the histogram in the same manner as discussed above.

If the monitored intensity $I_k$ (x, y) is above the threshold intensity, then the current value of k is incremented by one in step 171 and the subroutine 152 beginning with step 167 is repeated. If $I_k$ (X, y) falls below or equal to $I_{thres}$, then in step 170 the processor 30 calculates the average intensity value Iave of the space, such as space 82 of FIG. 4, by summing the intensities $I_k$ (x, y) along the path m as was done when determining the intensity of the previous bar, described above.

Once the average intensity Iave has been calculated, preferably in the manner described above for calculating the average intensity of a bar, the processor 30 in step 172 compares the intensity of the presently monitored position $I_k$ (x, y) to 60% of the average intensity Iave, in other words, 0.6*Iave. If the intensity of the monitored position $I_k$ (x, y) is equal to or greater than 0.6*Iave, then the value k is incremented by one interval and steps 167 and 168 are repeated. If $I_k$ (x, y) is less than 0.6*Iave, then the processor 30 proceeds to step 178, where it determines whether the space has been completely crossed. The crossing of the space is determined in step 178 by calculating, as was performed in the previous bar example, the difference between the sum of the intensities of the two previous monitored points $I_{k-1}$ and $I_{k-2}$ and the sum of the intensities of the next two points $I_{k+1}$ and $I_{k+2}$ beyond the monitored position along the path m. Then, the absolute value of the difference is compared with the average intensity Iave, using the same equation, as described above, as when determining if a bar has been crossed. The processor 30 considers the space as having been crossed when the difference in intensities along the direction of travel, i.e., path 89 in FIG. 4, exceeds the average intensity value Iave of a space crossing. The position of the space crossing (x, y) and the value of k at which the crossing has been completed is recorded as a value $S(p_{i'm})=k$ in step 180. The subroutine 152 then returns to routine 150, as shown in FIG. 5D. If the threshold is not exceeded in step 172, then the process repeatedly proceeds from step 167 until the average is exceeded.

In step 154 of routine 150 (FIG. 5D), the processor 30, once it has determined the path lengths under subroutine 152, calculates the terminating edge direction Θi'm. Then in step 156 the processor 30 uses the edge direction Θi'm to determine if the path along the edge direction will lead to erroneous results. If so, the edge direction Θi'm is recomputed and the process is repeated. However, in step 156, unlike the corresponding step when dealing with the crossing of a bar, π is subtracted from the difference of angles to correct for pointing away from a bar and toward a space. Once the processor 30 in step 158 determines that the path m is satisfactory, the value of m is incremented by one in step 153, then the subroutine 150 loops back to node B in the routine 40 and the width of spaces along the next path m is determined and recorded until the widths for paths 1 to N of a space i' have all been measured and step 158 allows the processor 30 to proceed in step 160. In step 160 the processor 30 compares the stored length of each of the m paths 1 to N on a particular space i' and the median space width $S_{i'}$ for the entire space is determined by the equation:

$$S_{i'} = \text{median}\{S(p_{i'm})\} \begin{matrix} N \\ m=1 \end{matrix}$$

The space width $S_{i'}$, is obtained to determine the most accurate reading of the width of the space, such as space 82, since absent any significant distortions that will be filtered out, as described below, the average path length through the space should be substantially perpendicular to the initial boundary. Next in step 161 the processor 30 compares each path length value of $S(p_{i'm})$ to a value that is twice the average space width $S_{i'}$, i.e., $2*S_{i'}$, to determine if the position being monitored along the direction of travel has left the recognition pattern 25. If $S(p_{i'm})$ exceeds this value, then it has entered the data portion 308 of the symbology 24, as shown in FIG. 3, or left the symbology 24 entirely. Then, the processor 30 proceeds to step 155 which tests the state variable T that indicates the sampling direction. If T=0, then the value of i' is incremented in step 157 to allow a new element to be evaluated. Then, in step 159, the processor 30 reverses the direction of travel by 180° and restarts from the initial boundary. Further, the state variable T is changed to 1 in step 159 to indicate that the path has been reversed and the routine then returns to node A of the main program 40. However, if T is determined to be 1 in step 155, then the routine exits to node F of the main routine 40. If in step 161 the processor 30 determines that $S(p_{im})$ is not more than twice as wide as Si, then the program proceeds to step 162 which increments the value "i'" and a new bar or space will be evaluated starting at step 44 of main routine 40. This process continues until the routines 100 and 150 determine that all respective bars and spaces within the recognition pattern 25 have been measured, or until step 54 of the main routine 40 determines that the maximum amount of all the bars and all the spaces that are possible to be measured in the largest the recognition pattern of code one symbols have been obtained.

Figure 5F:
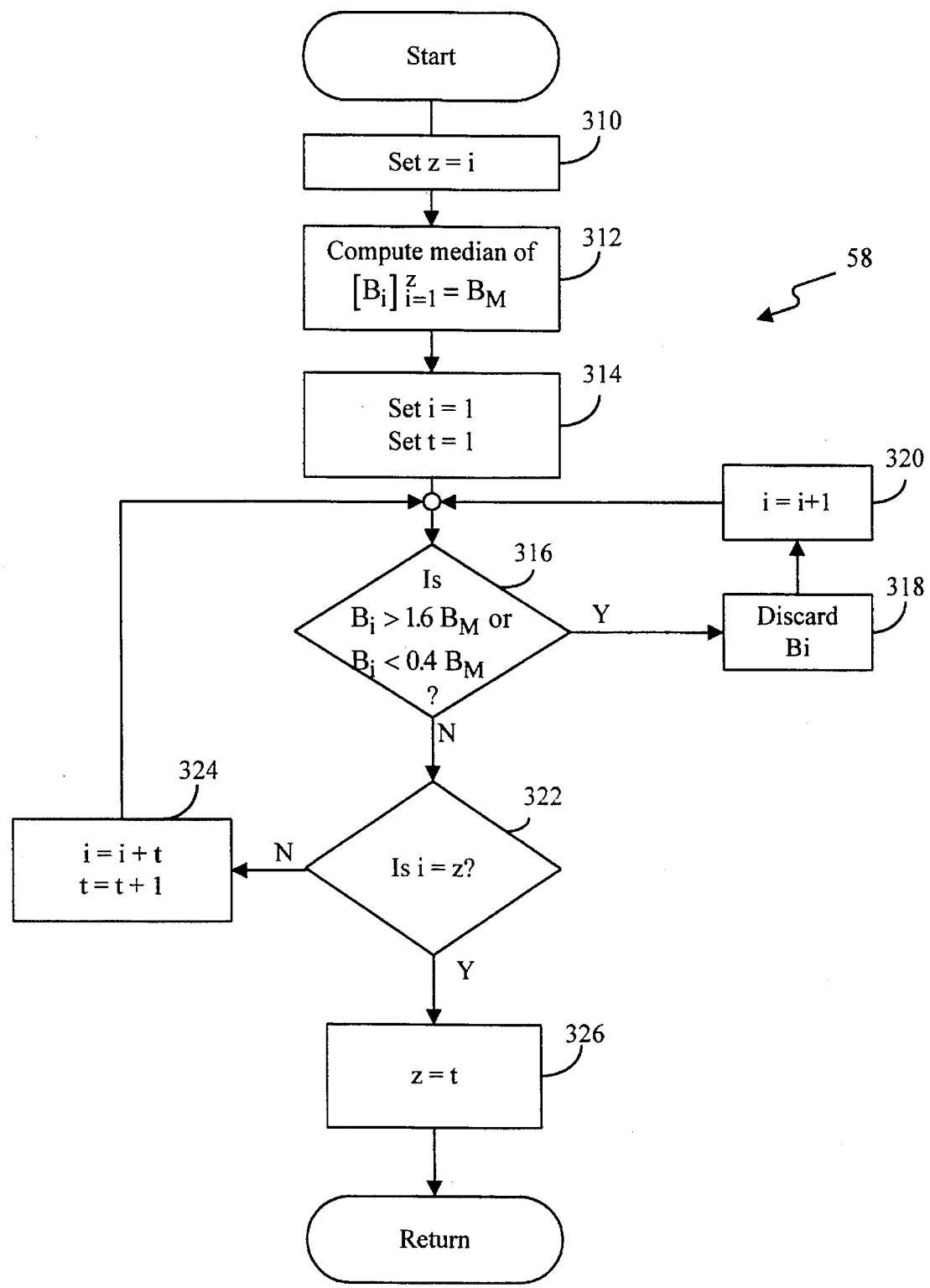
FIG. 5F is a flowchart of a trimming subroutine for eliminating measured minimum bar widths that deviate from a bar width average by some predetermined percentage.

In step 58 of the main routine 40 shown in FIG. 5A, a trimming subroutine for bars is invoked. Initially, the trimming subroutine 58, as shown in FIG. 5F sets a variable z equal to the total number of bars i in step 310. Then, the processor 30 in step 312 computes a median bar width $B_m$ from the average bar widths measured in routine 100. The total number of bars i is then re-initialized to a value of 1 by the processor 30 in step 314, also a value t is initialized to a value of 1. Then, in step 316, the processor 30 compares the average bar width $B_i$ with the median bar width $B_m$ and in step 318 discards any measurement that exceeds 160% of the median bar width i.e., $1.6*B_m$ or is less than 40% of the median bar width i.e., $0.4*B_m$ then increments the value of i by 1 to test the next bar width in step 320. In step 322 the processor 30 checks to see if all the bars z have been tested in step 316, if not, then the processor 30, in step 324, increments the value i and the value t, which will represent the total number of bars that fall within the conditions of step 316. Finally, when the total number of bars i have been evaluated in step 322, the processor 30 sets the variable z=t, which as stated above represents the total number of bars remaining after the erroneous measurements, usually due to a distortion, such as the distortion 85 in FIG. 4, and returns to the main routine 40.

Following the subroutine 58 in the main routine 40 is step 60 which adds all the remaining average bar widths with the equation:

$$\sum_{i=1}^{z} B_i = B_j.$$

Figure 5G:
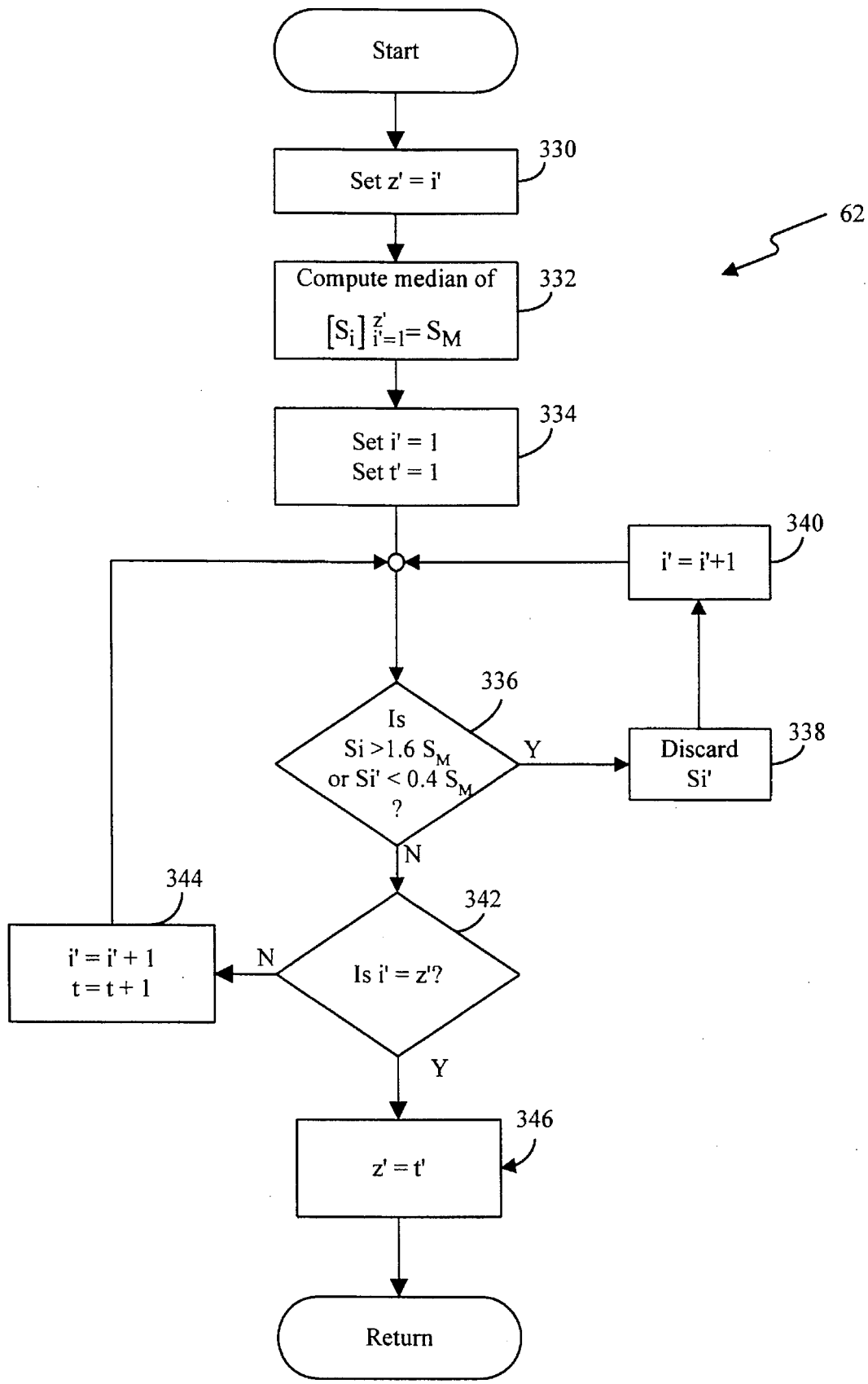
FIG. 5G is a flowchart of a trimming subroutine for eliminating measured minimum space widths that deviate from a space width average by some predetermined percentage.

The processor 30 then invokes trimming subroutine 62 for spaces, shown in FIG. 5G. Initially, the processor 30 in step 330 of trimming routing 62 sets a variable z' equal to the total number of spaces i'. Then, in step 332 the processor 30 computes a median space width $S_m$ from the average space widths measured in routine 152. The total number of spaces i' is then re-initialized to a value of 1 by the processor 30 in step 334, also a value t' is initialized to a value of 1. Then, in step 336, the processor 30 compares the average space width Si with the median space width Sm and in step 338 discards any measurement that exceeds 160% of the median space width, i.e., $1.6*S_m$ or is less than 40% of the median space width, i.e., $0.4*S_m$. Then, in step 340, the processor 30 increments the value of i' by 1 to test the next average space width. In step 342 the processor 30 checks to see if all the spaces z' have been tested in step 336 and if not, then the processor 30 in step 344, increments the value i' and the value t', which will represent the total number of spaces that fall within the conditions of step 342. Finally, when the total number of spaces i' have been evaluated in step 342, the processor 36 sets the variable z'=t', which as stated above represents the total number of spaces remaining after the erroneous measurements, usually due to distortion, such as the distortion 85 in FIG. 4, and returns to the main routine 40. Following subroutine 62 in the main routine 40 is step 64 which adds all the trimmed average space widths with equation:

$$\sum_{i'=1}^{z'} S_i = S_j.$$

Finally, the values of $B_j$ and $S_j$ are added and divided by the total number of bars and spaces remaining after the trimming process to yield the X-dimension in step 66 using the equation:

$$X_{dim} = \frac{B_j + S_j}{z + z'}.$$

The process then ends until a new symbol is evaluated.

Accordingly, the present invention allows the determination of the X-dimension using a method that is independent of a symbology's orientation and achieves acceptable results, even if the symbology is distorted, by sampling elements in the symbology at distributed intervals so that a few errors due to distortion and the like will not have a dramatic impact on the final calculation of the X-dimension.

Except as otherwise disclosed herein, the various components shown in outline or block form in FIG. 3 are individually well known and their internal construction and their operation is not critical either to the making or the using of this invention or to a description of the best mode of the invention.

While the detailed description above has been expressed in terms of specific examples, those skilled in the art will appreciate that many other configurations could be used to accomplish the purpose of the disclosed inventive apparatus. Accordingly, it will be appreciated that various equivalent modifications of the above-described embodiments may be made without departing from the spirit and scope of the invention. Therefore, the invention is to be limited only by the following claims.

I claim:

1. A method of estimating an X-dimension of a machine-readable symbol having a recognition pattern that includes elements comprising bars and spaces, said method proceeding from a boundary between two of the elements of the machine-readable symbol, the method comprising the steps of:

selecting a plurality of sampling paths across a particular one of the elements at the boundary;

determining a median path length across the particular one of the elements out of each of the plurality of sampling paths;

repeating said selection of a plurality of sampling paths and said determination of the median path length for each of the elements of the recognition pattern; and estimating the X-dimension of the machine-readable symbol based on the minimum path length for at least some of the elements.

2. The method of estimating an X-dimension of a machine-readable symbol according to claim 1 wherein said step of estimating an X-dimension comprises the step of:

averaging the median path length of the at least some of the elements.

3. The method of estimating an X-dimension of a machine-readable symbol according to claim 1 wherein said step of selecting a plurality of sampling paths comprises the step of:

separating the plurality of sampling paths at equidistant positions along the boundary.

4. The method of estimating an X-dimension of a machine-readable symbol according to claim 1 wherein said step of selecting a plurality of sampling paths comprises the step of:

determining an initial edge direction across the particular one of the elements for each of the plurality of sampling paths.

5. The method of estimating an X-dimension according to claim 4 wherein the initial edge direction for each of the plurality of sampling paths across the particular one of the elements is substantially perpendicular to a line that is tangent to the boundary at a position of a respective one of the plurality of sampling paths.

6. The method of estimating an X-dimension according to claim 4, further comprising the steps of:

ascertaining a terminating edge direction at each point where the plurality of sampling paths complete their respective pass across the particular one of the elements;

determining if each of the plurality of sampling paths is traveling substantially straight across the particular one of the elements by comparing the initial edge direction with the terminating edge direction for each of the plurality of sampling paths; and redetermining the initial edge direction of any of the plurality of sampling paths not traveling substantially straight across the particular one of the elements.

7. The method of estimating an X-dimension according to claim 1 wherein said step of determining the median path length comprises the steps of:

measuring over a preselected number of intervals an intensity of the particular one of the elements for each of the plurality of sampling paths;

averaging the intensity of the preselected number of intervals to calculate the average intensity of the particular one of the elements for each of the plurality of sampling paths;

calculating a threshold intensity of the particular one of the elements for each of the plurality of sampling paths;

proceeding by at least one of the intervals to measure intensity along each of the plurality of sampling paths until the intensity along a respective one of the plurality of sampling paths deviates beyond the threshold intensity; and determining a width across the particular one of the elements along each of the plurality of sampling paths based on the intervals traveled along each of the respective sampling paths.

8. The method of estimating an X-dimension according to claim 7, further comprising the step of:

selecting a median width from the determined width of each of the plurality of sampling paths of the particular one of the elements.

9. The method of estimating an X-dimension according to claim 8, further comprising the steps of:

comparing the median width of each of the elements of the recognition pattern; and discarding the width of those elements that deviate by more than a predetermined percentage from a median minimum width.

10. The method of estimating an X-dimension according to claim 7 wherein the threshold intensity of one of the bars is a first predetermined percentage above the average intensity, and the threshold intensity of one of the spaces is a second predetermined percentage below the average intensity.

11. The method of estimating an X-dimension according to claim 10 wherein the intensity along a respective one of the plurality of sampling paths deviates beyond the threshold intensity when the intensity falls below the threshold intensity and when measuring one of the spaces and exceeds the threshold intensity when measuring one of the bars.

12. The method of estimating an X-dimension of a machine-readable symbol according to claim 1 wherein the symbol comprises a Code One symbol.

13. An apparatus for estimating an X-dimension of a machine-readable symbol having a recognition pattern that includes elements comprising bars and spaces, said apparatus preceding from an initial boundary between two of the elements of the machine-readable symbol, the apparatus comprising:

a sensor that receives light reflected by the machine-readable symbol and produces an output signal therefrom;

a receiver that receives the output signal from said sensor and produces a data signal indicative of the recognition pattern; and a processor for processing the data signal and determining the X-dimension of the symbol, said processor programmed to:

(i) select a plurality of sampling paths across a particular element at the initial boundary;

(ii) determine a median path length across the particular element of each of the plurality of sampling paths;

(iii) repeat steps (i) and (ii) for each the elements of the recognition pattern; and (iv) average the median path length for all the elements to provide the estimated X-dimension of the machine-readable symbol.

14. The apparatus for estimating an X-dimension according to claim 13 wherein said processor determines the median path length across the particular element for each of the sampling paths by being programmed to:

(i) measure an intensity of the particular element over a preselected number of intervals for each of the plurality of sampling paths;

(ii) average the intensity of the preselected number of intervals to calculate the average intensity of the element for each of the plurality of sampling paths;

(iii) calculate a threshold intensity of the particular element for each of the plurality of sampling paths;

(iv) proceed by at least one of the intervals to measure intensity along each of the plurality of sampling paths until the intensity along a respective one of the plurality of sampling paths deviates beyond the threshold intensity;

(v) determine a width across the particular element along each of the plurality of sampling paths based on the intervals traveled along each of the respective sampling paths; and (vi) select an average width from the determined width of each of the sampling paths of the particular element.

15. A method of sampling used to estimate the X-dimension of a Code One symbol having a recognition pattern containing elements consisting of bars and spaces each having a width and a length, an initial boundary between two of the elements having been determined, said method comprising the steps of:

(a) selecting an amount of samples to be taken of the width of a particular one of the elements;

(b) separating the samples at equidistant positions along the boundary between two of the elements;

(c) determining an initial edge direction for each of the samples that is perpendicular to a line that is tangent to the boundary of a position of a respective one of the samples;

(d) measuring over a preselected number of intervals along the edge direction an intensity of the particular one of the elements for each of the samples, where each use of the preselected number of intervals covers an area less than the width of the particular one of the elements;

(e) averaging the intensity of the preselected number of intervals to calculate the average intensity of the element and repeating this for each of the samples;

(f) calculating a threshold intensity of the element for each of the samples, where the threshold intensity for one of the bars is a first predetermined percentage above the average intensity, and the threshold intensity for one of the spaces is a second predetermined percentage below the average intensity;

(g) proceeding by at least one of the intervals to measure intensity along the edge direction for each of the samples until at least one of (1) the measured intensity exceeds the threshold intensity when the element is one of the bars, and (2) the measured intensity falls below the threshold intensity if the element is one of the spaces;

(h) determining a terminating boundary and a width of the element for each sample based on the intervals proceeded;

(i) ascertaining a terminating edge direction at the terminating boundary and comparing it with its corresponding initial edge direction for each sample to determine if the path of the sample is traveling perpendicular to the length of the particular one of the elements, and if it is not redetermining the initial edge direction and repeating steps (c)–(i);

(j) selecting an average width from the determined width of each sample of the particular one of the elements;

(k) repeating steps (a)–(j) for each element of the recognition pattern by making the terminating boundary the initial boundary;

(l) comparing the average value of the average width of each element of the recognition pattern and discarding any of the elements that deviate by more than a third predetermined percentage from adjacent elements leaving only trimmed minimum width values; and (m) summing the trimmed average width values and dividing by the number of elements remaining after said step of comparing the minimum value of the width of each element to calculate the estimated X-dimension.

* * * * *